United States Patent

Suh

(10) Patent No.: US 6,507,825 B2
(45) Date of Patent: Jan. 14, 2003

(54) ACTIVITY INFORMATION ACCOUNTING METHOD AND SYSTEM

(75) Inventor: Won-Kyo Suh, Wooseong 7-cha Apt. 112-208, Ilwon-dong 615, Kangnam-ku, Seoul (KR)

(73) Assignee: Won-Kyo Suh, Seoul (KR)

( * ) Notice: Subject to any disclaimer, the term of this patent is extended or adjusted under 35 U.S.C. 154(b) by 0 days.

(21) Appl. No.: 09/977,223

(22) Filed: Oct. 16, 2001

(65) Prior Publication Data

US 2002/0016752 A1 Feb. 7, 2002

Related U.S. Application Data

(62) Division of application No. 09/421,067, filed on Oct. 19, 1999, now Pat. No. 6,330,545, which is a continuation-in-part of application No. 08/714,497, filed on Sep. 16, 1996, now Pat. No. 6,085,173, which is a continuation of application No. 08/274,708, filed on Jul. 14, 1994, now abandoned.

(30) Foreign Application Priority Data

Jul. 27, 1993 (KR) ............................................ 93-14324

(51) Int. Cl.⁷ .............................................. G60F 17/60
(52) U.S. Cl. ...................................................... 705/30
(58) Field of Search .......................................... 705/30

(56) References Cited

U.S. PATENT DOCUMENTS

| | | | |
|---|---|---|---|
| 4,642,767 A | 2/1987 | Lerner | 364/406 |
| 5,193,055 A | 3/1993 | Brown et al. | 364/406 |
| 5,390,113 A | 2/1995 | Sampson | 364/419.19 |
| 5,592,620 A | 1/1997 | Chen et al. | 395/200.01 |
| 5,799,286 A | 8/1998 | Morgan et al. | 705/30 |

FOREIGN PATENT DOCUMENTS

JP 5-28166 2/1993

OTHER PUBLICATIONS

*PC Magazine*, V6, N15, p. 168(2), "Missing Links: An Insiders View of What You Need (But Rarely Get) From Accounting Software", G. Williams Dauphinus, Sep. 15, 1987.

Robert B. Nadel, "Review of One–Write Plus Version 2.0: Accounting System for the Small, Unsophisticated Client", *CPA Journal*, V59, N2, pp. 50–55.

"It's Time to Stop Overselling Activity–Based Concepts" by H. Thomas Johnson, Management Accounting, vol. 74, No. 3, pp. 26–35, Sep. 1992.

"Cost Accounting Standards: Putting the Pieces Together", by Darrel A. Sourwine, Management Accounting, vol. 73, No. 1, pp 44–49, Jul. 1991.

*Primary Examiner*—Kenneth R. Rice
(74) *Attorney, Agent, or Firm*—Finnegan, Henderson, Farabow, Garrett & Dunner, L.L.P.

(57) ABSTRACT

The activity information accounting system stores an account title table corresponding to activity information, and performs accounting procedures on the basis of an input activity information and an account title corresponding to the input activity information. The accounting system displays activity types including purchase and acquisition activity, sales and revenue activity, expenditure activity, investment and finance activity, and production activity. If user selects one of the displayed activity types, the accounting system displays a screen for the user to input activity information for the selected activity type. The accounting system determines if the input activity information is internal activity or external activity, performs accounting procedures on the basis of determined result and the account title table.

4 Claims, 13 Drawing Sheets

FIG.5

| Activity / Resource | Resource Driver | Unit | Production Plan | Order | Work Preparation | Machinery Operation | Quality Control | Transport | Total of Resource Driver Values |
|---|---|---|---|---|---|---|---|---|---|
| Salary | Working Time | Hour | 1,000 | 1,000 | 1,000 | 1,000 | 1,000 | 1,000 | 15,000 |
| Electricity | Quantity Used | Kw | 50,000 | 50,000 | 50,000 | 800,000 | 50,000 | 0 | 1,000,000 |
| Gas and Water | Quantity Used | unit | 50,000 | 50,000 | 100,000 | 200,000 | 50,000 | 50,000 | 500,000 |
| Communications | Time Used | Minute | 4,000 | 4,000 | 4,000 | 0 | 4,000 | 4,000 | 20,000 |
| Repairs | Frequency | Number | 0 | 0 | 8 | 0 | 0 | 2 | 10 |
| Supplies | Quantity Used | unit | 150 | 150 | 200 | 200 | 150 | 150 | 1,000 |
| Depreciation | Period | Year | 0 | 0 | 0 | 1 | 0 | 0 | 1 |

FIG. 6

| Activity / Resource | Production Plan | Order | Work Preparation | Machinery Operation | Quality Control | Transport | Resource Value |
|---|---|---|---|---|---|---|---|
| Salary | 10,000 | 10,000 | 10,000 | 100,000 | 10,000 | 10,000 | 150,000 |
| Electricity | 5,000 | 5,000 | 5,000 | 80,000 | 5,000 | 0 | 100,000 |
| Gas and Water | 10,000 | 10,000 | 20,000 | 40,000 | 10,000 | 10,000 | 100,000 |
| Communications | 4,000 | 4,000 | 4,000 | 0 | 4,000 | 4,000 | 20,000 |
| Repaires | 0 | 0 | 40,000 | 0 | 10,000 | 10,000 | 50,000 |
| Supplies | 15,000 | 15,000 | 20,000 | 20,000 | 15,000 | 15,000 | 100,000 |
| Depreciation | 0 | 0 | 0 | 80,000 | 0 | 0 | 80,000 |
| Activity Cost | 44,000 | 44,000 | 99,000 | 320,000 | 44,000 | 49,000 | 600,000 |

FIG. 7

| Activity | Activity Cost | Product A | Product B | Total | Unit Activity Cost |
|---|---|---|---|---|---|
| Production Plan | 44,000 | 9 | 13 | 22 | 2,000 |
| Order | 44,000 | 7 | 15 | 22 | 2,000 |
| Work preparation | 99,000 | 4 | 6 | 10 | 9,900 |
| Machinery Operation | 320,000 | 560 | 1040 | 1600 | 200 |
| Quality Control | 44,000 | 8 | 36 | 44 | 1,000 |
| Transport | 49,000 | 16 | 12 | 28 | 1,750 |
| Total | 600,000 | | | | |

FIG.8

| Activity | Unit Activity Cost | Product A | | Product B | |
|---|---|---|---|---|---|
| | | Activity Driver | Activity Cost | Activity Driver | Activity Cost |
| Production Plan | 2,000 | 9 | 18,000 | 13 | 26,000 |
| Order | 2,000 | 7 | 14,000 | 15 | 30,000 |
| Work Preparation | 9,900 | 4 | 39,600 | 6 | 59,400 |
| Machinery Operation | 200 | 560 | 112,000 | 1,040 | 208,000 |
| Quality Control | 1,000 | 8 | 8,000 | 36 | 36,000 |
| Transport | 1,750 | 16 | 28,000 | 12 | 21,000 |
| Indirect Cost | | | 219,600 | | 380,000 |

FIG. 9

| Activity | Unit Activity Cost | Product A | | Produt B | |
|---|---|---|---|---|---|
| | | Activity Driver | Activity Cost | Activity Driver | Activity Cost |
| Production Plan | 2,000 | 9 | 18,000 | 13 | 26,000 |
| Order | 2,000 | 7 | 14,000 | 15 | 30,000 |
| Work Preparation | 9,900 | 4 | 39,600 | 6 | 59,400 |
| Machinery Operation | 200 | 560 | 112,000 | 1,040 | 208,000 |
| Quality Control | 1,000 | 8 | 8,000 | 36 | 36,000 |
| Transport | 1,750 | 16 | 28,000 | 12 | 21,000 |
| Indirect Cost | | | 219,600 | | 380,000 |
| Direct Cost | | | 100,000 | | 300,000 |
| Total Manufacturing Cost | | | 319,600 | | 680,000 |
| Quantity Produced | | | 50,000 | | 50,000 |
| Unit Cost for Product | | | 6.392 | | 13.608 |

FIG.10

| (19XX.X.X.) | | |
|---|---|---|
| Activity: | | |
| Account Title | | Value |
| | | |
| | | |
| | | |
| | | |
| | | |
| | | |
| | | |
| Total | | |

| Title | Value | |
|---|---|---|
| I. Cash Basis operating Revenue | | 500 |
| 1. Sales | 305 | |
| II. Cash Basis Operating Expense | | 387 |
| 1. Cash Basis Cost | 305 | |
| 2. Cash Basis Expense | 82 | |
| III. Cash Basis operating Income before Tax | | 113 |
| IV. Depreciation Expense | | 51 |
| V. Operating Income before Tax | | 62 |
| VI. Tax | | 14 |
| VII. Operating Income Less Tax | | 48 |
| VIII. Capital Cost | | 36 |
| IX. EVA | | 12 |

FIG.12

|  | Current Year | Prior Year | method I | Method II |
|---|---|---|---|---|
| Cash Flow(C) | C1 | C0 | C1/C0 | C1/P1 |
| Economic Value(V) | V1 | V0 | V1/V0 | V1/C1 |
| Profit(P) | P1 | P0 | P1/P0 | V1/P1 |

ACTIVITY INFORMATION ACCOUNTING METHOD AND SYSTEM

This is a division of application Ser. No. 09/421,067, filed Oct. 19, 1999 now U.S. Pat. No. 6,330,545 which is a continuation-in-part of application Ser. No. 08/714,497, filed Sep. 16, 1996 (now U.S. Pat. No. 6,085,173), which is a continuation of application Ser. No. 08/274,708 filed Jul. 14, 1994 (abandoned) all of which are incorporated herein by reference.

BACKGROUND OF THE INVENTION (a) Field of the Invention

The present invention relates to an accounting method and system, and more particularly, to an activity information accounting method and system in which accounting reports can be prepared by simply inputting business activity information such that complicated recording procedures can be avoided.

(b) Description of the Related Art

Various accounting methods are used to keep track of the business activities of a company, and to ultimately allow managers, stockholders, etc. of a company to conduct business analyses. In conventional accounting methods, after a business transaction is performed, the transaction is categorized and typical bookkeeping is performed to record the transaction.

FIG. 1 shows a flow chart of a conventional accounting method. As shown in the drawing, after a business activity is performed in step S10, it is determined if the business activity falls under the category of a commercial transaction requiring recording through book-keeping methods in step S20. If it is not (for example various internal activities), no additional procedures are performed. However, if it is determined in step S20 that the business activity is a commercial transaction, the business activity is divided into debits and credits, then the debits and credits are classified into specific journal entries in step S30. In step S30, classification into specific journal entries refers to matching the debits and credits of business activities with one of approximately 300 account titles. For example, debits include such account titles as a reduction in assets, increase in debt decrease in capital, and increase in expense, etc.; while credits include account titles such as an increase in assets, decrease in debt, increase in capital, and increase in revenue, etc.

Subsequently, a daily trial balance sheet is prepared in step S40. The daily trial balance sheet aids in ensuring that accumulated debits and credits correspond. That is, accounting mistakes can be discovered more easily by preparing daily trial balance sheets rather than waiting after a more significant time has elapsed. Next, a trial balance sheet is prepared in step S50. The trial balance sheet covers a longer period of, for example, one month. Finally, in step S60, financial statements are prepared on the basis of the trial balance sheets. The financial statements typically includes a balance sheet for a year period, an income statement, and other such documents in which information is organized into a specified format.

In the process of classifying the debits and credits into specific journal entries of step S30 above, those performing the accounting procedures must be familiar with all the roughly 300 account titles. Further, even if the financial statements sheet is prepared using a personal computer or other such data processing system, the user must nevertheless know the large number of account titles in addition to the codes corresponding to the account titles. For this reason and the fact that many other concepts, rules, etc. must be known, the conventional accounting process can only be performed by professionals.

Resulting from this fact that only trained professionals can perform accounting procedures when using conventional accounting methods, there exists a considerable lag between the time of undertaking a business activity and accounting of the same. That is, it is not possible to perform accounting procedures immediately as business activities occur since information pertaining to the business activities are first reported to an accountant or accounting department, after which accountants perform the task of recording the information.

In addition, using conventional accounting methods, business activities not failing under one of the designated specific journal entries are not reflected in the financial statements. Further, the results of accounting processes can only be known through the financial statements, which include the balance sheet and the income statement. Accordingly, merely the asset situation of the company (e.g., the cash balance), and the profit or loss for a period of time can be known, while such important measures as cash flow can not be known using these documents.

In more detail, with conventional accounting methods, profits and losses for varying lengths of time are determined through the income statement, with the amount of profit or loss is considered one of the most important measures of company performance. However, since profits and losses are calculated on the basis of returns for a company, not only can cash flow not be determined, but other measures reflecting the performance of company are not well reflected. Accordingly, complicated procedures must be used to prepare various other documents including a cash flow statement.

Finally, since only business activities determined to be commercial transactions are recorded when using conventional accounting methods, internal business activities are not reflected in the accounting reports. An example of such an internal business activity is the use of specific number of kilowatts of electricity by a department A to manufacture product B. Because these internal activities are not reflected in documents derived from conventional accounting methods, performance by department, etc. can not be known.

SUMMARY OF THE INVENTION

The present invention has been made in an effort to solve the above problems.

It is an object of the present invention to provide an accounting method and system in which those not trained in the field of accounting are also able to prepare accounting reports by simply inputting business activity information, without having to undergo the complicated process of making journal entries.

It is another object of the present invention to provide an accounting method and system in which not only balance sheet and income statements can be prepared, but which also enables the preparation of cash flow statement and other accounting reports that provide different measures of overall company worth and performance.

It is still another object of the present invention to provide an accounting method and system in which suitable analyses and accounting reports can be prepared using information of predetermined business activities not falling under the category of commercial transactions.

The accounting method according to one aspect of the present invention uses a data processing system that stores an account title table corresponding to activity information, and performs accounting procedures on the basis of an input activity information and an account title corresponding to the input activity information.

The accounting method comprises the steps of: (a) displaying activity types including purchase and acquisition activity, sales and revenue activity, expenditure activity, investment and finance activity, and production activity; (b) receiving a user selection of one of the displayed activity types; (c) displaying a screen for the user to input activity information for the selected activity type; and (d) determining if the input activity information is internal activity or external activity, and performing accounting procedures on the basis of determined result and the account title table.

The accounting system according to one aspect of the present invention comprises a memory unit that stores an account title table corresponding to activity information, accounting program for performing accounting procedures on the basis of an input activity information and an account title corresponding to the input activity information, and an accounting result; an output unit which outputs activity types including purchase and acquisition activity, sales and revenue activity, expenditure activity, investment and finance activity, and production activity for user to select one of the activity types, and outputs a screen for inputting activity information for the selected activity type; and a central processing unit (CPU) that determines if the input, activity information is internal activity or external activity, and performs accounting procedures on the basis of determined result and the account title table.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 5 to 8 are charts of examples for each step shown in FIG. 4;

FIGS. 9 to 14 are examples of accounting reports prepared by the accounting system and method of the present invention.

DETAILED DESCRIPTION OF THE PREFERRED EMBODIMENTS

Preferred embodiments of the present invention will now be described in detail with reference to the accompanying drawings.

Figure 1:
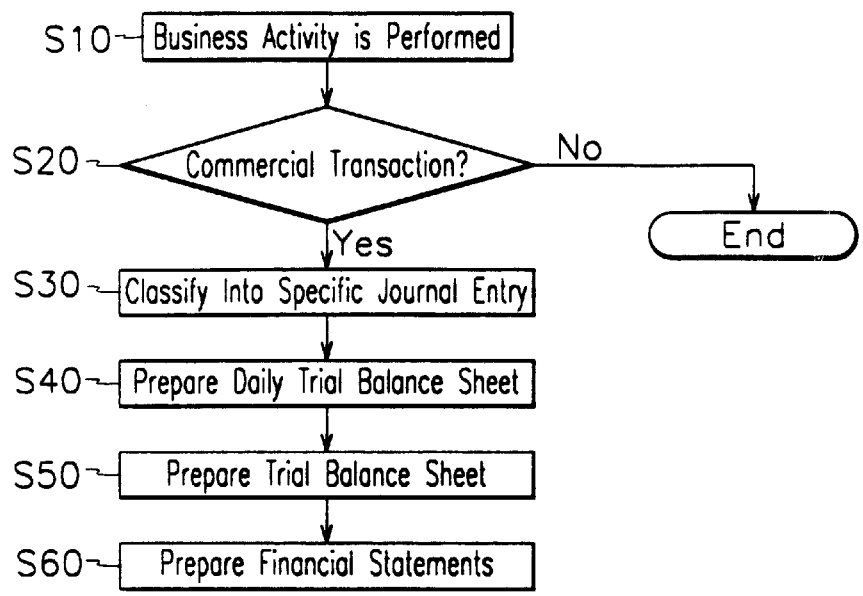
FIG. 1 is a flow chart of a conventional accounting method.
Figure 2:
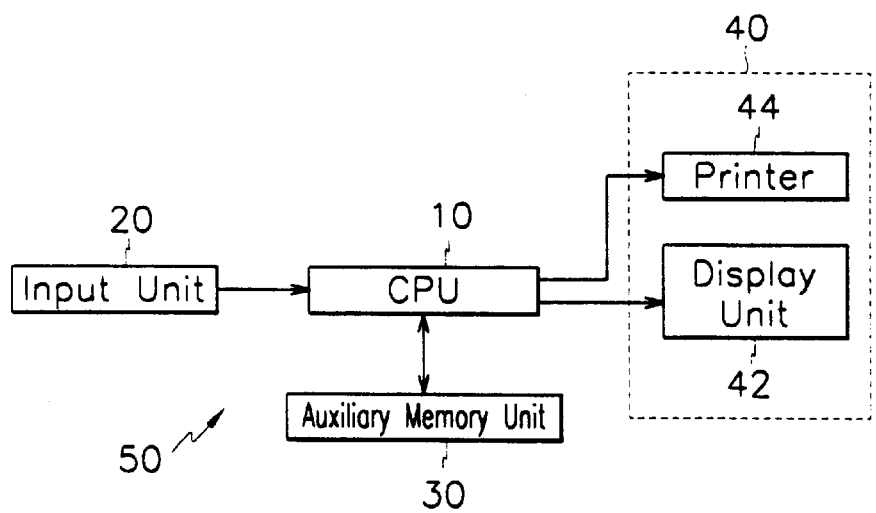
FIG. 2 is a block diagram of an accounting system according to a first preferred embodiment of the present invention.

FIG. 2 shows a block diagram of an accounting system according to a first preferred embodiment of the present invention. Reference numeral 50 in the drawing indicates the accounting system. The accounting system 50 comprises a central processing unit (CPU) 10, an input unit 20, an auxiliary memory unit 30, and an output unit 40.

The CPU 10 decodes program instructions for performing accounting procedures (which will be described hereinafter), and carries out the program instructions. The CPU 10 includes a ROM (read only memory) and a RAM (random access memory) for processing data. The input unit 20 includes a keyboard, mouse and other such devices through which a user inputs data relating to business activities.

The output unit 40 outputs results of the accounting system of the present invention after the system performs various predetermined processes on the data input through the input unit 20, the processes being outlined in a method of the present invention to be described hereinafter. The output unit 40 includes a printer 44 and a display unit 42 for performing this function. Finally, the auxiliary memory unit 30 stores a program for performing the processes of the inventive method, and stores results of the method in a predetermined file format.

Figure 3:
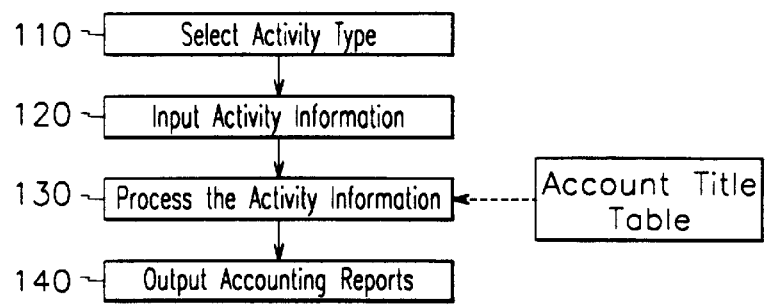
FIG. 3 is a flow chart of an accounting method according to a preferred embodiment of the present invention.

FIG. 3 is a flow chart of the accounting method according to a preferred embodiment of the present invention.

First, in step S110, the user classifies the business activity performed into one of various activity types through the input unit 20 of the accounting system 50. That is, after a business activity has been performed, the user operates the accounting system 50 to select one from the business activity types displayed on the display unit 42 of the output unit 40. Examples of different types of business activities that may be displayed on the display unit 42 include purchase and acquisition activity, sales and revenue activity, expenditure activity, investment and finance activity, production activity (internal activity), closing activity, etc. The business activity types may categorize external activity, internal activity and closing activity. The external activity refers to an activity that performs transactions with an external organization or company, and comprises the purchase and acquisition activity, the sales and revenue activity, the expenditure activity, and the investment and finance activity. The internal activity refers to an activity that produces products or provides services using provided resources in the organization such as production activity.

As can be seen, such classifications of business activities vastly differ from the account titles used in the prior art accounting methods, enabling almost anyone to easily perform the task of classifying business activities into different types.

After step S110, the user inputs various information related to the business activity in step S120. in more detail, after the user classifies the business activity into one of the predetermined types in step S110, the accounting system 50 then displays through the display unit 42 a screen requesting more information. The user then fills in the information requested through the mouse, keyboard, etc. of the input unit 20. Examples of additional information requested include the date on which the business activity took place; person and department conducting the business activity; name of business activity; costs, income, etc. involved in the business activity; and products sold or parts, materials, etc. The process of inputting data by the user is completed after step 120 (i.e., after only two steps).

Next, the information input by the user is processed using the program stored in the auxiliary memory unit 30 in step S130. That is, the accounting system 50 first determines if the business activity falls under the category of an internal activity or an external activity, then performs predetermined processes on the information with reference to a table of predetermined account titles. Finally, accounting reports are output in step S140. Examples of accounting reports include balance sheet, income statement, cash flow statement, activity based costing report, economic value report, etc.

Figure 4:
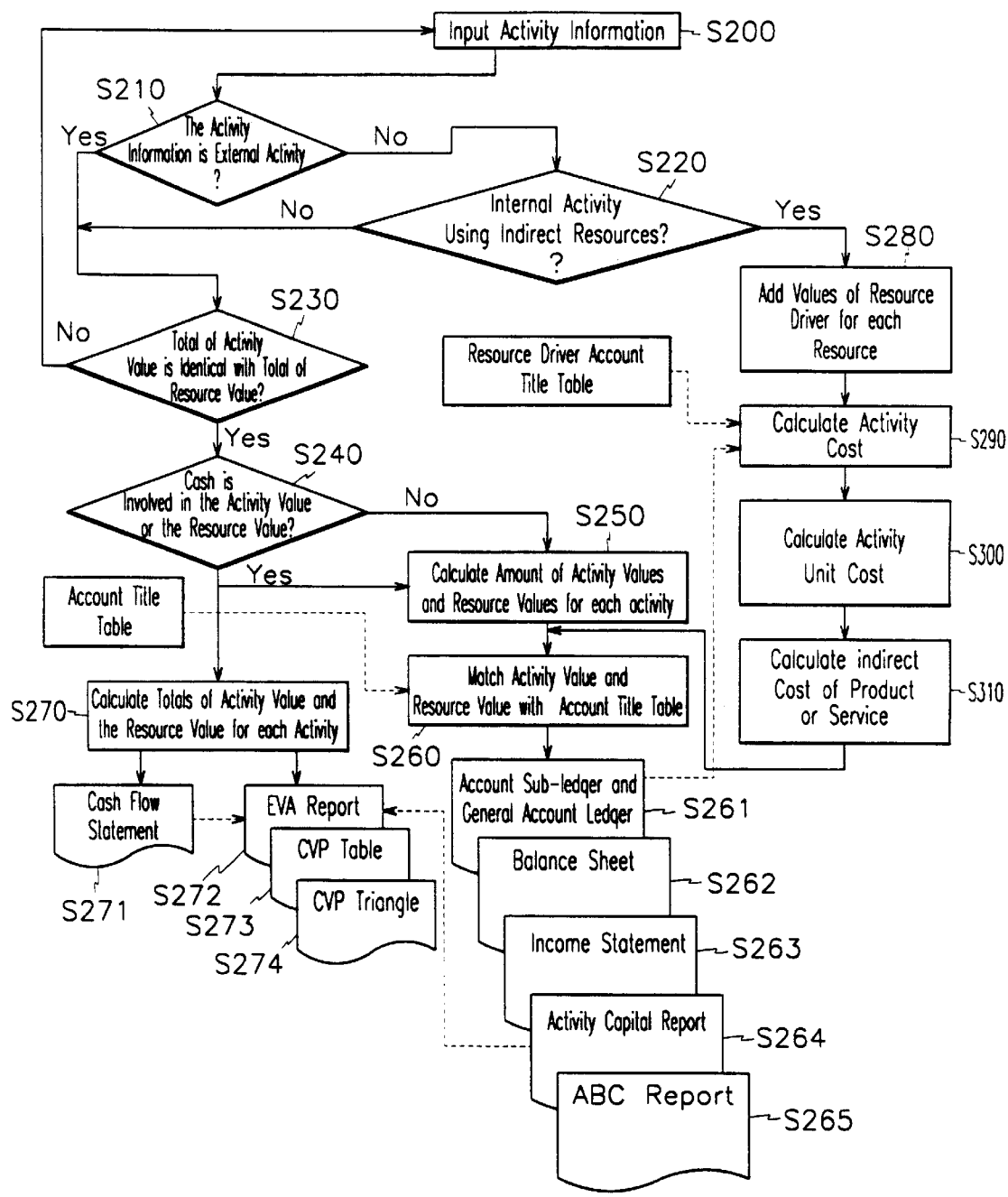
FIG. 4 is a detailed flow chart of a portion of the accounting method shown in FIG. 3.

FIG. 4 shows a detailed flow chart of a portion of the accounting method shown in FIG. 3. That is, FIG. 4 illustrates in detail the many steps involved in steps S310 and S140 of FIG. 3.

After information related to a business activity is input in step S200, the accounting system 50 determines if the business activity is an internal activity or an external activity in step S210. If it is determined in stop S210 that the business activity is an external activity, it is then determined if a total of an input activity value is identical with an input resource value in stop S230. If totals of the activity value and resource value are not identical, a message is output to the user requesting the re-input of business activity information. That is, the process returns to stop S200. At this time, "activity value" refers to the value of the activity itself, whereas "resource value" refers to the value of resources required to make the activity possible. For example, if a product is sold for $1000 and $600 is received in cash and $400 is paid on credit, then the activity is classified as sales having a total activity value of $1000, and the resource value is divided into cash and credit sales, respectively having values of $600 and $400.

In the accounting method of the preferred embodiment, the activity value and the resource value must match, much like the principle used in conventional methods in which debits and credits correspond. However, in the present invention, the separating into credits and debits is not done by hand, but instead is accomplished by simply recording the activity name, activity value, resource name, and resource value so that the overall process is simplified to an extent enabling anyone to perform such tasks.

In step S230 above, if the total of the activity value is identical with the total of the resource value, it is then determined if cash is involved in the activity value or the resource value in step S240. If all or part of either the activity value or resource value is cash in stop S240, then the total cash flow for each activity is calculated in step S270. Simultaneously, a running total for each of the activity value and resource value is calculated in step S250.

After the cash flow for each activity is determined, a cash flow statement is prepared in step S271 and an economic value report is prepared in step S272. The economic value report is a document prepared according to the method of the present invention, and will be described hereinafter. According to the present invention, in the case where an inflow and outflow of cash accompanies each activity, since such information for each of the activity value and resource value is recorded, it is possible to prepare the cash flow statement and the economic value report by tallying the cash flow for each activity. Accordingly, it is not necessary to separately prepare a cash flow statement as in the prior art in order to determine the cash flow of a company.

In step S240, if it is determined that cash is not involved in the activity value and resource value, only stop S250 is performed in which the totals of the activity value and the resource value are calculated. Next using an account title table, each of the activity value and resource value is matched with an account title, then an amount for each the activity value and resource value is recorded in step S260. Accordingly, by merely inputting activity information as described above, the activity is automatically matched with a corresponding account title as used in conventional methods such that financial statements, like those resulting from prior art accounting methods, can be provided to the user. The account title table used in the preferred embodiment is stored in the auxiliary memory unit 30, and is temporarily transferred and stored in the RAM of the CPU 10 when the accounting system 50 of the preferred embodiment is operated.

Subsequently, using the information of the matched activities with the account titles, an account sub-ledger for each account title and a general account ledger are prepared in step S261, a balance sheet is prepared in step S262, and a income statement is prepared in step S263. All these reports are identical to what is provided using conventional accounting methods.

In step S210, if it is determined that the business activity is not an external activity (i.e., an internal activity), it is then determined if the internal activity is using a direct resource or an indirect resource in step S220. Here "direct resource" refers to a resource that goes directly into producing a product or providing a service such as raw materials, and "indirect resource" refers to a resource used indirectly to produce a product or provide a service such as electricity, water, heating expenses, rent, etc. In step S220, if it is determined that the internal activity is using a direct resource, then step S230 is performed, after which the other steps are performed as described above.

The preferred embodiment assumes that internal activity produce a product or provide a service using resources. That is, it is assumed that the resources input for the internal activity produce a product or provide a service. Under such assumption, it is necessary to measure quantity of resources used for internal activity and quantity of activity used for product or service to calculate cost of product or service. For such necessity, the preferred embodiment uses concepts of resource driver and activity driver, which are measurements for representing quantity of resources used for internal activity and quantity of activity used for product or service, respectively.

On the other hand, if the internal activity is using an indirect resource in step S220, resource driver values for each resource are added in step S280. Here, the resource drivers are measured in minutes, hours, years, kilowatts, frequency, etc. In more detail with reference to FIG. 5, the different types of indirect resources include salary, electricity, gas and water, communications, maintenance and repairs, supplies, and depreciation (of equipment, machinery, etc.). The resource driver corresponding respectively to the different types of indirect resources are working time, quantity used, quantity used, time used, frequency, quantity used, and period. These internal resources are used for the different types of internal activities including production plan, order, working preparation, machinery operation, quality control, and transport. As shown in the last column of FIG. 5, the totals of resource driver values for each resource are calculated in step S280.

After step S280, a cost of the internal activity (it may be referred to as activity cost) is calculated in step S290. This is illustrated in detail in FIG. 6.

First, a unit resource value is calculated dividing resource value by sum of resource driver values for each resource (a unit resource value for each resource=resource value/sum of resource driver values). The resource value may be obtained from the account sub-ledger and general account ledger in the step 261. For example, if it is assumed that resource value of salary is $150,000 as shown in FIG. 6, since the sum of resource diver values for salary is 15,000 hours, unit salary (resource value) is 10 $/hour (=$150,000/15,000 hours).

After calculating unit resource value for each resource, resource value used for each internal activity is obtained by multiplying resource driver value used for each internal activity and the unit resource value. For example, salary used for production plan can be obtained as $10,000 by multiplying unit resource value having 10 ($/hour) by resource driver value having 1000 hours in the FIG. 6. After calculating all resource values for each internal activity as described method, activity cost for each internal activity is obtained by adding all resource value for each activity.

After calculating the activity cost in step S290, unit activity cost is obtained dividing activity cost by sum of activity driver values (for example, time, frequency, quantity) for internal activity illustrated in FIG. 7. For example, with regard to production plan in FIG. 7, activity driver having 9 hour were used in the production plan activity for product A, while activity driver having 13 hour were used for product B, for a total of 22 hour. This sum of activity driver value is divided into the activity cost having $44,000 such that unit activity cost having 2,000 ($/hour) for production plan is obtained.

Following step S300, indirect costs for each product (or service) is calculated in step S310. This is illustrated in detail in FIG. 8. As shown in the drawing, for each internal activity, unit activity costs are multiplied activity driver values for each product such that an activity cost of each product for each internal activity is obtained. For example, the unit activity cost of $2,000 is multiplied by activity driver values (hours) needed to produce product A (i.e., 9) so that an activity cost for product A is calculated to $18,000. All activity costs for product A are added thereby determining a total indirect cost for product A. These indirect costs are used to prepare an activity based costing report, which will be described hereinafter.

Accounting reports prepared according to the preferred embodiment will be described hereinafter.

First, the activity based costing (ABC) report is provided according to activity information accounting method of the preferred embodiment as shown in FIG. 9.

The ABC report provides cost information for each product or service, which are made on the basis of concept that activity produces product or provides service using resources A conventional costing report merely provided value of used resources (for example, material, salary, gas and water, electricity, communications) without any relationship with specific product or services. On the other hand, the ABC report provides cost information of each activity used for specific product or service. That is, the ABC report provides cost information of each activity, indirect cost, direct cost which is directly used for specific product, total manufacturing cost for each product which is obtained by adding the indirect cost and direct cost for each product, and unit cost for each product, as shown in FIG. 9.

Figure 10:
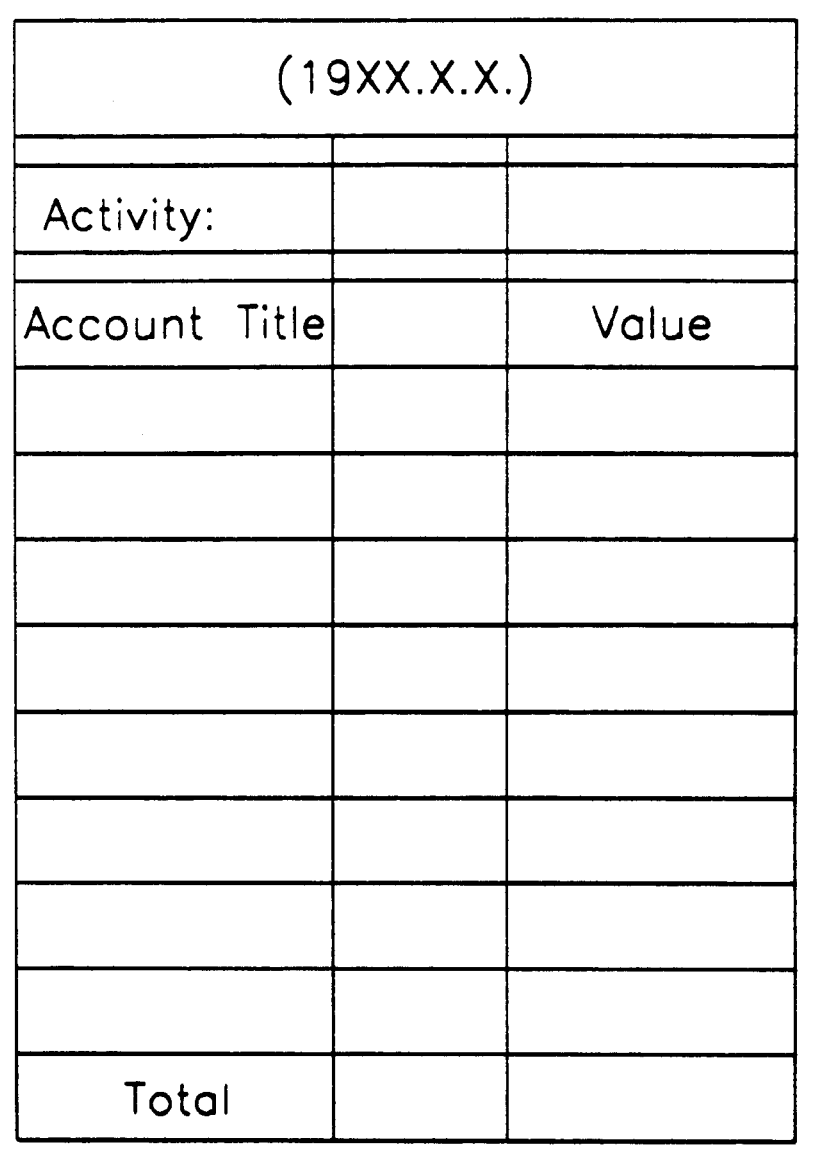

Second, the preferred embodiment provides the activity capital report as shown in FIG. 10. The activity capital report represents information on capital used for each activity, which is necessary to calculate economic value for each activity. A capital cost may obtain multiplying the capital by interest rate, which is recorded in economic value report as described hereinafter.

Third, the preferred embodiment provides the economic value (EVA) report as shown in FIG. 11. The EVA report represents value which is subtracted sum of depreciation expense, tax and capital cost from cash basis operating income, as economic value. That is, the EVA report represents cash basis operating income before tax which is obtained by subtracting cash basis operating expense from cash basis operating revenue, and operating income before tax which is obtained by subtracting depreciation value from the cash basis operating income before tax. Furthermore, the EVA report represents operating income less tax which is obtained by subtracting tax from the operating income before tax, and economic value which is obtained by subtracting capital cost from operating income less tax.

Fourth, the preferred embodiment includes a CVP table and a CVP triangle which provide information on cash flow C, economic value V and profit C at the same time. The CVP table provides information on correlation with C, V, P, as shown in FIG. 12. The CVP table receives information on current and prior years of cash flow C1 and C0, current and prior years of economic values V1 and V0, and current and prior years of profits P1 and P0 from cash flow statement, EVA report, and income statement, respectively. The CVP table provides valuable information by specific analytical method, on the basis of the received information. The CVP table may provide information on degree of increase or decrease of C, V, P dividing current information C1, V1, PI by prior information C0, V0, P0 as analytical method 1, and may provide information on correlation with C, V, P as analytical method 11.

Figure 13:
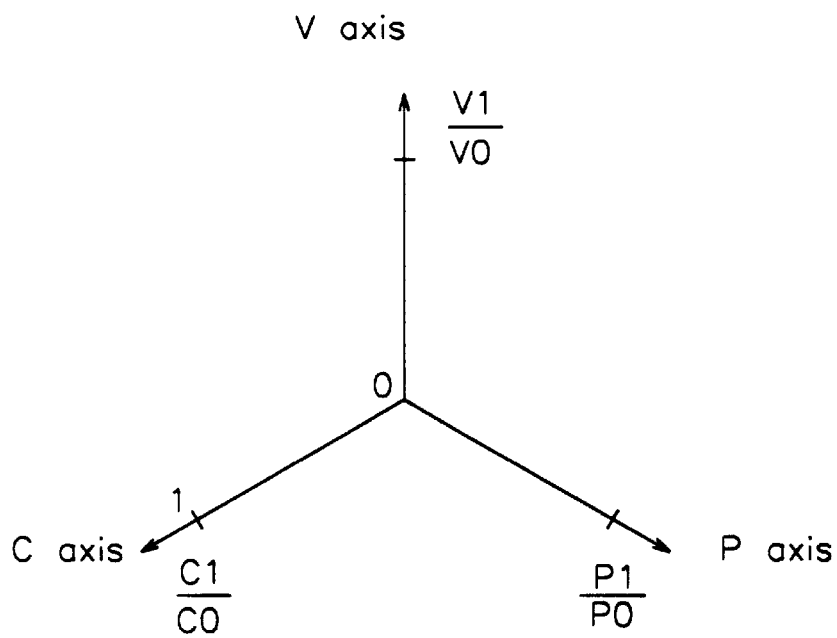
Figure 14:
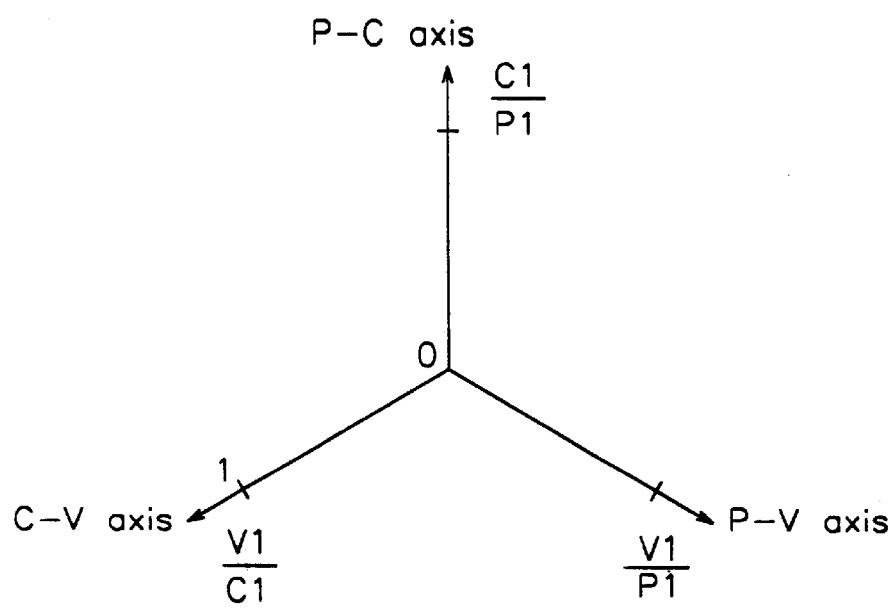

FIGS. 13 and 14 represent CVP triangles using the analytical method I and the analytical method 11, respectively.

The CVP triangle shown in FIG. 13 represents a ratio of C1 to C0 (C1/C0), a ratio of V1 to V0 (V1/V0), and a ratio of P1 to P0 (P1/P0) on three axis, that is, C axis, V axis, and P axis, respectively. The values placed on the three axis represent degree of increase or decrease of cash flow, economic value, and profit, respectively.

The CVP triangle shown by FIG. 14 represents a ratio of C1 to P1 (CI/P1), a ratio of V1 to P1 (V1/P1), and a ratio of V1 to C1 (V1/C1) on three axis, that is, P-C axis, P-V axis, and C-V axis, respectively. The values placed on the three axis represent correlation with P, V, C.

It has been described about activity based accounting method according to the preferred embodiment by accounting system using individual computer system as shown in FIG. 2. On the other hand, the accounting method may be implemented with an accounting system using network computer system such as LAN and Internet systems.

Figure 15:
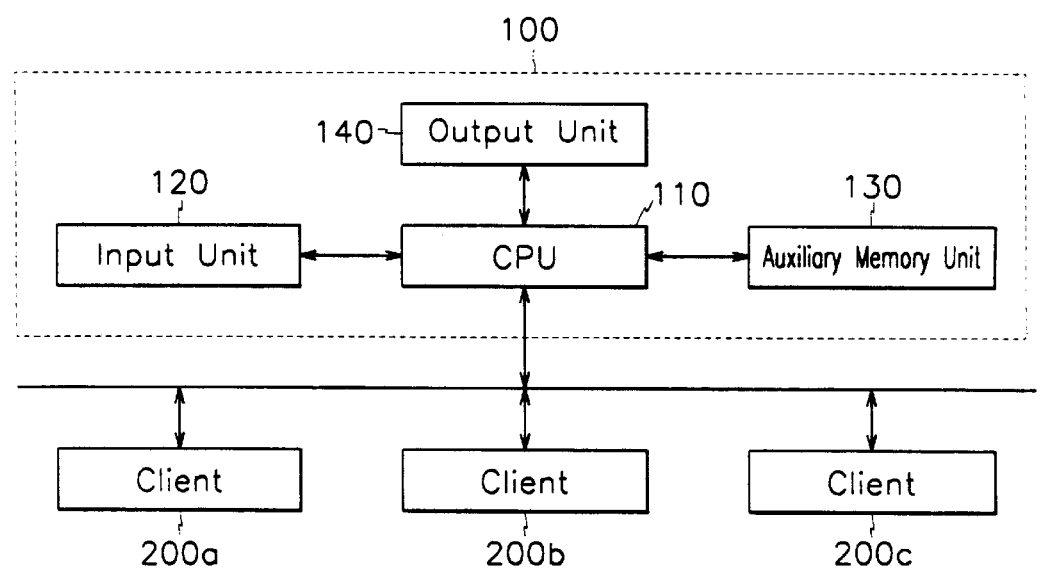
FIG. 15 is a block diagram of an accounting system according to a second preferred embodiment of the present invention.
Figure 16:
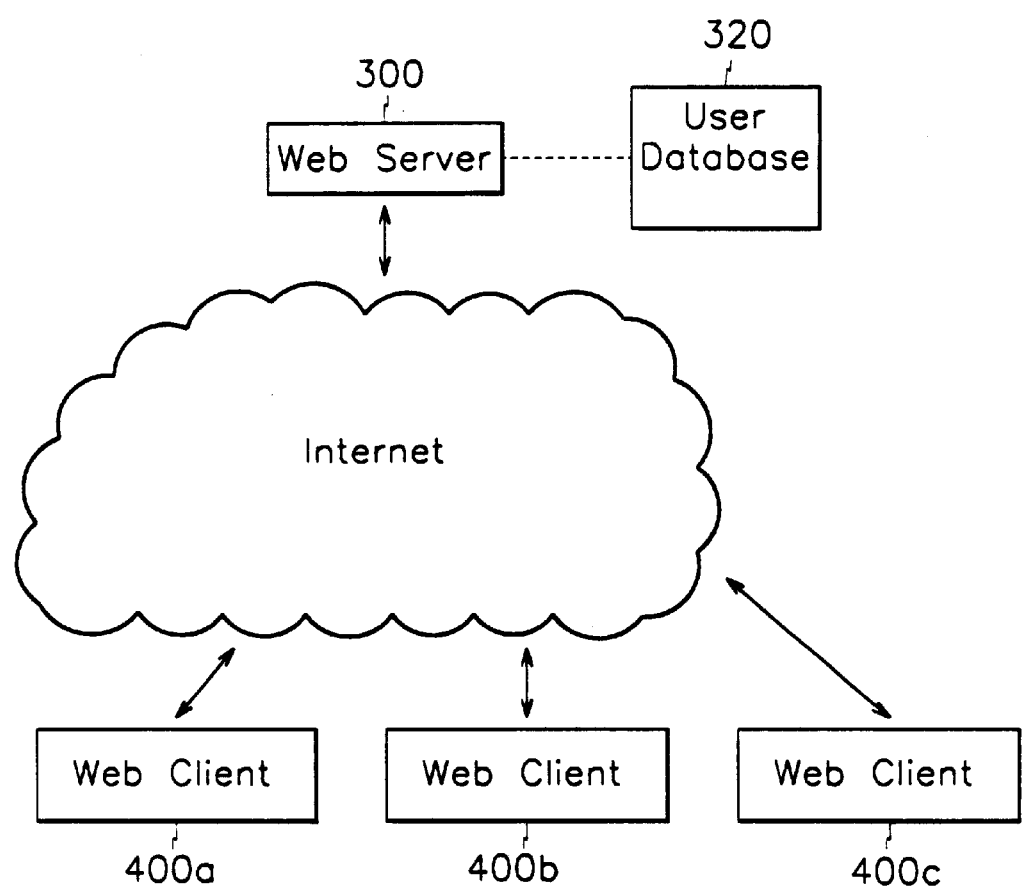
FIG. 16 is a block diagram of an accounting system according to a second preferred embodiment of the present invention.

FIGS. 15 and 16 show a block diagram of an accounting system according to a a second and a third preferred embodiment of the present invention.

As shown in FIG. 15, the accounting system according to the second embodiment comprises an accounting server 100 and a plurality of clients 200a, 200b, 200c.

If user inputs an activity information through the clients, the accounting server 100 performs accounting procedures for the input activity information as described above. The accounting server 100 comprises a CPU 110, an input unit 120, an auxiliary memory unit 130, and an output unit 140.

The CPU 110 decodes program instructions for performing accounting procedures, and carries out the program instructions, as described above. The input unit 120 is used for inputting data and command required for operation of the server 100. The output unit 140 outputs results of the accounting system of the present invention after the system performs various predetermined processes on the data input through the clients. Finally, the auxiliary memory unit 130 stores a program for performing the processes of the inventive method, and stores results of the method in a predetermined file format.

The clients 200a, 200b, 200c may be provided in each department of company. If business activity occurs in a department, user worked at the department inputs an activity information through the client.

The operation of the accounting system according to the second preferred embodiment is similar to that of the accounting system of the first preferred embodiment except that the activity information is input through each client and the accounting server performs the process of the inventive method.

As shown in FIG. 16, the accounting system according to the third embodiment comprises a web server 300 and user database 320, and a plurality of web clients 400a, 400b, 400c.

If user inputs an activity information through the web clients, the web Server 300 performs accounting procedures for the input activity information as described above, and provides performed results to web clients through Internet. The user database 320 stores user information such as user's ID, password, and accounting information on each user.

The web client is referred to a computer system through which a user can be connected to the web server 300. If a business activity occurs, a user connects to the web server through the client, and inputs the activity information by input unit of the web client. The web server 300 determines if input user's ID and password is authorized, and outputs results responsive to the input activity information to the corresponding client.

The operation of the accounting system according to the third embodiment will be described.

If a business activity occurs, a user connects to the web server 300 through the web client and inputs the user's ID and password. The web server 300 determines if input user's ID and password registered the user database 320, and displays activity types of the preferred embodiment including purchase and acquisition activity, sales and revenue activity, expenditure activity, investment and finance activity, production activity, and closing activity to web client.

The user selects one of the activity types corresponding to business activity performed, and inputs detailed activity information through the web client. The web server performs process on the input activity information as described inventive method, and stores the processed results into the user database 320 and transmits the same to web client.

Although preferred embodiments of the present invention have been described in detail herein above, it should be clearly understood that many variations and/or modifications of the basic inventive concepts herein taught which may appear to those skilled in the present art will still fall within the spirit and scope of the present invention, as defined in the appended claims.

What is claimed is:

1. An activity information accounting system, comprising:
   a memory unit which stores an account title table corresponding to activity information, accounting program for performing accounting procedures on the basis of an input activity information and an account title corresponding to the input activity information, and an accounting result;
   an output unit which outputs activity types including purchase and acquisition activity, sales and revenue activity, expenditure activity, investment and finance activity, and production activity for user to select one of the activity types, and outputs a screen for inputting activity information for the selected activity type; and
   a central processing unit (CPU) which determines if the input activity information is internal activity or external activity, and performs accounting procedures on the basis of determined result and the account title table.

2. The activity information accounting system of claim 1, wherein the activity information is input through a client provided on each department.

3. The activity information accounting system of claim 1, wherein the activity information is input through a web client via Internet.

4. The activity information accounting system of claim 3, further comprising a user database which stores accounting information on each user and user information including user's ID and password.

* * * * *